April 16, 1929. M. J. LIDE Re. 17,272

PULSATING JIG

Original Filed Oct. 18, 1920 5 Sheets-Sheet 1

Inventor

MARTIN J. LIDE

By

Attorney

April 16, 1929. M. J. LIDE Re. 17,272

PULSATING JIG

Original Filed Oct. 18, 1920 5 Sheets-Sheet 2

Inventor

MARTIN J. LIDE

By

Attorney

April 16, 1929. M. J. LIDE Re. 17,272

PULSATING JIG

Original Filed Oct. 18, 1920 5 Sheets-Sheet 3

Inventor

MARTIN J. LIDE

By

Attorney

April 16, 1929. M. J. LIDE Re. 17,272

PULSATING JIG

Original Filed Oct. 18, 1920 5 Sheets-Sheet 4

Inventor

MARTIN J. LIDE

By

Attorney

April 16, 1929. M. J. LIDE Re. 17,272

PULSATING JIG

Original Filed Oct. 18, 1920 5 Sheets-Sheet 5

Inventor

MARTIN J. LIDE

By

Attorney

Reissued Apr. 16, 1929. Re. 17,272

UNITED STATES PATENT OFFICE.

MARTIN J. LIDE, OF BIRMINGHAM, ALABAMA.

PULSATING JIG.

Original No. 1,491,870, dated April 29, 1924, Serial No. 417,783, filed October 18, 1920. Application for reissue filed October 31, 1925. Serial No. 66,106.

My invention relates to a jig for the separation of minerals of different specific gravities which relies upon impulses of water to effect the separation and stratification of the particles under treatment.

One distinctive feature of my invention is the utilization of an elongated rotary or osciliatory valve substantially co-extensive with the screen and thus adapted to deliver the water impulse with substantial uniformity for the length or width of the screen, according to its arrangement lengthwise or transversely of the screen.

A further feature of my invention is the arrangement and synchronous operation of such elongated inlet valves when disposed on opposite sides of the jig, so as to further increase the uniformity of the effect of the impulses transversely as well as lengthwise of the screen.

A further feature of my invention consists in the application of means for reducing the power required to pump the water into the jig to a minimum. It can be demonstrated that for a given quantity of water being pumped into the jig, the power required will vary inversely as the square of the valve opening, or directly as the difference in elevation between the surface levels in the jig tanks and the water tank supplying it. A condition of minimum power consumption would therefore require a long rectangular valve opening rather than a square or circular opening. This condition I meet by making a rectangular valve opening substantially the length or width of the screen as previously stated.

A further object of my invention is to simplify the means for producing the impulses and to this end I flank the jig on one or both sides, according to the type, with water tanks in which a predetermined head of water is maintained and from which the water is fed in impulses to the jig tank by the elongated rotating valve or valves.

The distinctive features above described for producing the impulses are applicable to various types of jigs and my invention contemplates certain improved results obtained with a fixed screen by the arrangement of the elongated impulse valves alongside the screen, or by the utilization of a single impulse valve disposed transversely across the upper end of the jig tank and thus directing its impulses towards the discharge end of the tank.

A further feature of my invention is that it lends itself peculiarly to jigs of the type employing traveling screens. Here the screen is submerged in the tank with the impulse valves disposed between the upper and lower flights of the screen, and, according to the relative position of the feed gate, the discharge chute for the lighter material and the direction of rotation of the screen, the apparatus will function as a concurrent or counter-current jig.

My invention will be better understood in its various embodiments by reference to the accompanying drawings, in which:—

Figs. 5 and 6 are similar views of a jig with a moving screen arranged for concurrent flow operation, while

Similar reference numerals refer to similar parts throughout the drawings.

Figure 1:
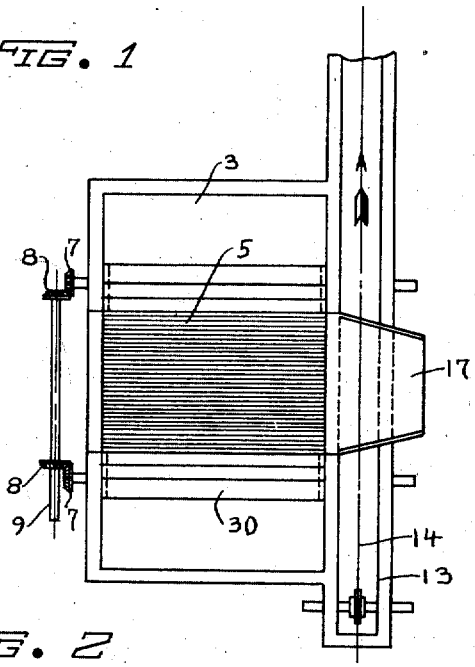
Figs. 1 and 2 illustrate in plan and vertical cross section a jig with a fixed screen and side impulse valves.
Figure 2:
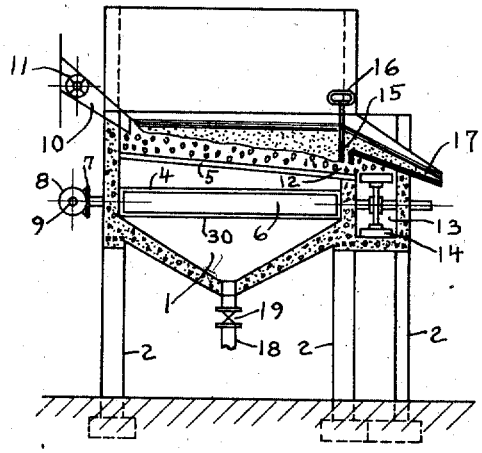
Figure 9:
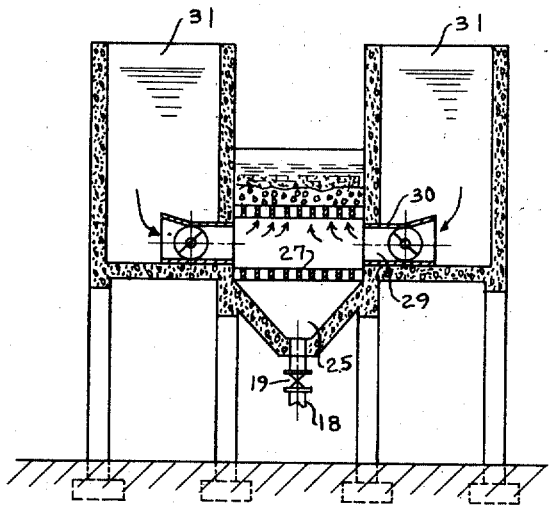
Fig. 9 is a transverse central cross-sectional view taken through Fig. 6 or 8.

As illustrated in Figs. 1 and 2, I show a jig tank 1 mounted on suitable supports 2 and flanked on each side by an elevated water tank 3 provided near its bottom with a port 4 substantially co-extensive with the length of the jig screen 5 and of the jig tank 1 and normally closed by an elongated rotating or oscillating butter-fly valve 6. These ports 4 are preferably rectangular and are disposed in opposition, as indicated in Fig. 9, and the valves preferably rectangular are driven by gears 7 which mesh gears 8 on a common driving shaft 9. A top feed gate 10 delivers the coal or mineral to be treated under control of a feeder 11 and at the discharge end of the screen I provide a bottom outlet 12, delivering into a trough 13 containing an endless conveyor 14 and an adjustable gate 15, operated by handles 16, which controls the overflow of the lighter particles to the discharge chute 17. Water can be drained from the jig tank through a pipe 18 under control of a valve 19.

In operation, the water in tanks 3 is maintained to an approximate predetermined level and when the shaft 9 is started, impulses of water, uniform for the length of the screen and directly from opposite sides, converge and flow upwardly with practically uniform effect through the screen 5 and effect, in the manner well understood in the art, the separation or stratification, according to their specific gravity, and by virtue of the flow of water over and across the top of the screen in conjunction if necessary with an inclination of the screen the material is caused to move lengthwise thereover, the heavier particles in the lower stratum passing to the trough 13 while the lighter particles in the upper stratum overflow through chute 17 with the surplus water, which in general practice will have the foreign matter in suspense therein settled out, after which it is returned to the tanks 3. The efficiency of the jig is due to the uniform distribution of the impulse throughout the cross-sectional area of the jig and to the simplicity of the operating mechanism which is confined to the two rotating valves with the result that the apparatus has negligible maintenance cost and requires a minimum power for operation.

Figure 3:
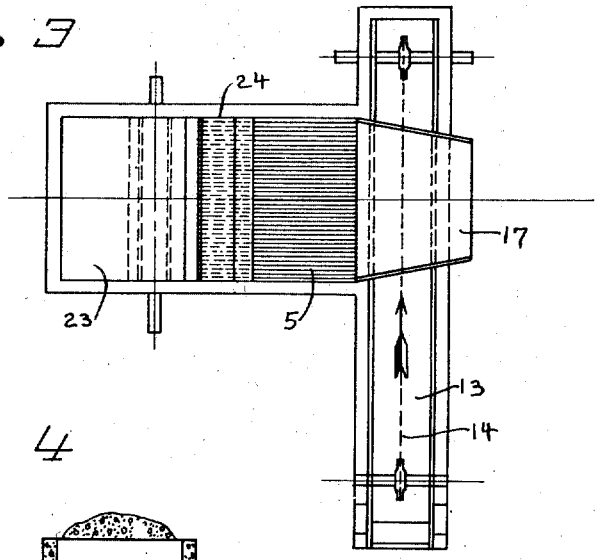
Figs. 3 and 4 are similar views of a jig having a single impulse valve across the upper end of the jig tank.
Figure 4:
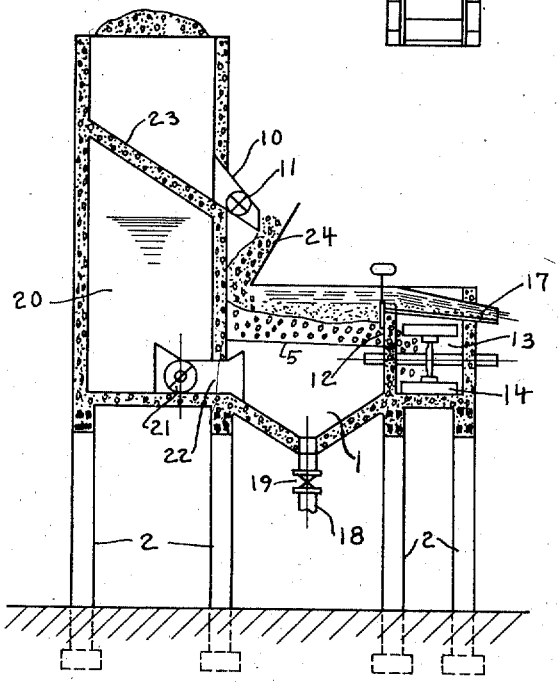

In Figs. 3 and 4, the jig mechanism is the same as described in connection with Figs. 1 and 2, except that a single water tank 20 is provided at the upper end of the jig tank in place of the side tanks 3 and the water impulses are delivered into the upper end of the jig tank 5 by the butter-fly valve 21 working in a flaring conduit 22 which extends from side to side across the jig tank and has its flaring ends projecting into both the water tank and jig tank. The water tank is closed over head by a sloping bottom 23 which delivers material to be treated to the feed gate 10, which in turn delivers it to a chute 24 which causes it to fall upon the upper end of the screen bed. The operation in this arrangement is similar to that described, except that the water impulses are derived wholly through the single water inlet below the upper end of the screen and as the impulses are discharged with equal force transversely of the tank and in the direction of the overflow, they facilitate the movement of the material on the screen towards the discharge.

Figure 5:
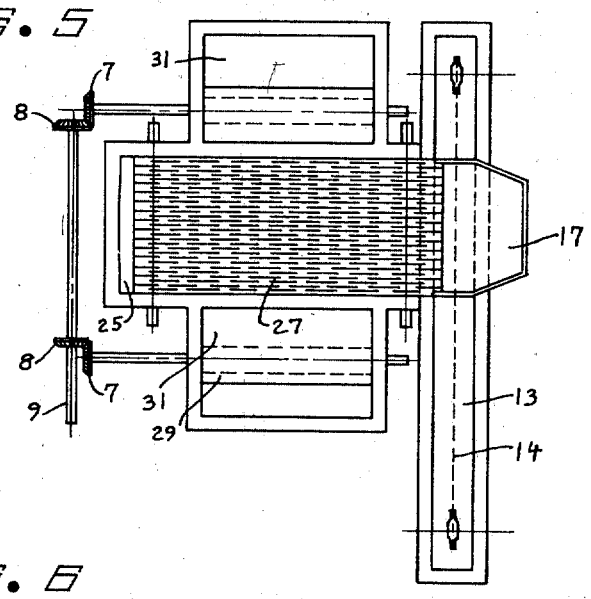
Figure 6:
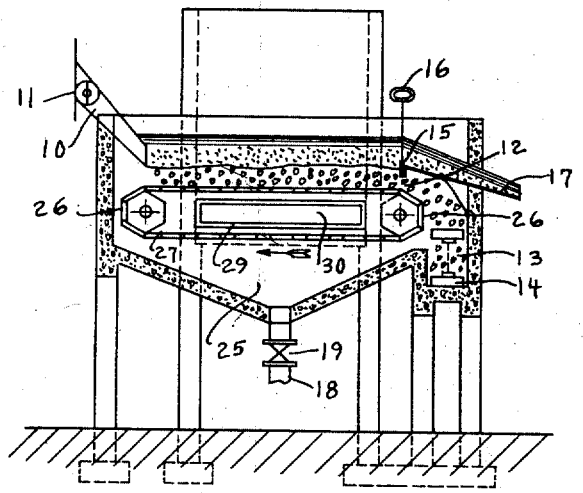

In Figs. 5 and 6, I show a jig arranged for concurrent flow of water and mineral utilizing a traveling screen. Here the jig tank 25 is elongated and at its ends has mounted sprocket wheels 26 which support and operate an endless chain screen 27 which is disposed substantially horizontal. These sprockets are driven by any suitable driving mechanism and cause the upper flight of the belt to travel continually and slowly towards the chute 17 and trough 13, in the latter of which the endless conveyor 14 works. The jig is flanked on each side by elevated water tanks 28, these tanks having elongated bottom ports in which are disposed conduits 29 in which butter-fly valves 30 work, see Fig. 9, which discharge into the jig tank between the upper and lower flights of the screen. The material is fed to the screen by the feed gate 10 under control of the feeder 11 and as the impulses of water enter and pass upwardly through the screen belt the material is separated and it is caused to move towards the discharge end of the jig both by the motion of the screen and by the concurrent flow of the water. This arrangement gives a very greatly increased output without materially complicating the mechanism.

Figure 7:
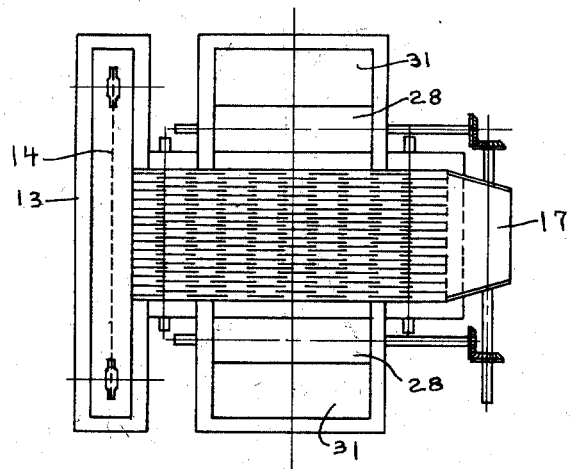
Figs. 7 and 8 show a jig with a moving screen arranged for counter-current flow operation.
Figure 8:
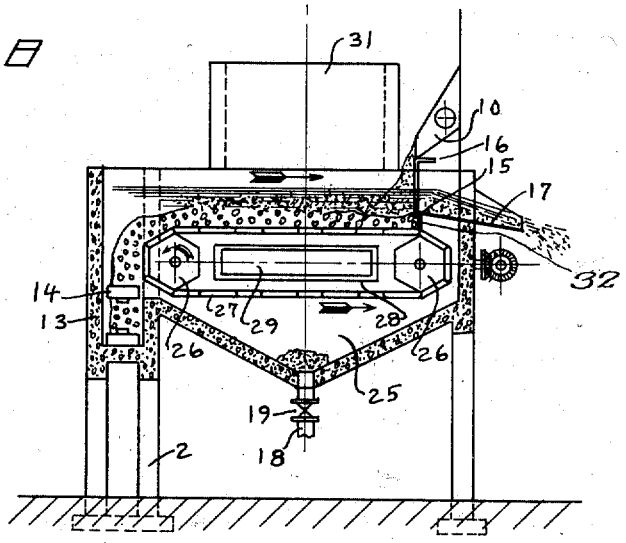

In Figs. 7 and 8, I show a jig similar to that described in Figs. 5 and 6, except that this design is changed for counter-current operation, that is to say, for the outflow of water counter to the direction of movement of the heavier particles on the screen. Here the jig tank 25 is flanked with the water tanks 28 from which the water impulses are admitted to the jig tank under control of valves 30 through conduits 29. The sprockets 26 serve to drive the endless chain in a direction counter to that in Fig. 6, and the trough 13 and conveyor 14 are disposed at the left hand end of the tank while the feed gate 10, the overflow chute 17 and gate 15 are arranged at the other end of the tank, the chute 17 having a downturned lip 32 which extends down close to the upper level of the traveling screen and serves to prevent any matter passing over the right hand sprocket 26. The operation in this arrangement is that the screen, as it moves, tends to carry with it the heavier particles towards the left and counter to the current of water flowing with the lighter particles towards the chute 17 at the right. In jigs of this character, where a large volume of water is supplied, with the impulses uniformly distributed, and relatively free of eddies and whirls, a most rapid and effective separation will take place and it will be found that the heavier particles are most effectively washed as they pass with the belt to the left.

My invention contemplates various other modifications in the design and arrangement of the screens, water tanks and inlet valves according to the different classes of material to be treated and the particular results sought, and it may therefore be widely varied within the scope of the appended claims.

Having thus described my invention, what I claim as new and desire to secure by Letters Patent, is:—

1. A jigging mechanism comprising a jig tank, a screen therein, a water tank alongside the screen, there being an elongated narrow inlet port connecting the tanks below the screen and substantially co-extensive with the adjacent marginal edge of the screen, a valve to control the admission of the water supply to the tank by pulsations through said port, said valve being co-extensive with the port, and separate juxtaposed outlets to conduct off the particles of different specific gravity after separation on the screen.

2. A jigging mechanism comprising a jig tank, a screen therein, a water tank alongside the screen having a narrow elongated substantially rectangular port connecting the tanks below the screen and substantially co-extensive with the adjacent side of the screen, a relatively narrow elongated rotatable valve extending the full length of said port, means to operate said valve to admit pulsations of water through said port into the jig tank, and means at one end of the jig tank to conduct off the particles of different specific gravity after separation on the screen.

3. A jigging mechanism comprising a jig tank, a screen therein, a water tank alongside the screen and substantially co-extensive in length with the adjacent side of the jig tank, there being a port substantially co-extensive in length with the jig screen which connects said tanks below the screen, which port has its vertical width reduced to the minimum dimension permissible to conduct the volume of water required for a pulsation under a given head in the water tank, a valve substantially co-extensive in length with said port, and means to admit the water supply to the jig tank by intermittently opening said valve to admit impulses of water below the screen, and means to conduct away from the same end of the jig tank separated material on the screen.

4. A jig comprising a jig tank, a screen, a pair of water tanks disposed on opposite sides of the screen tank and having ports entering the jig tank below the screen and extending substantially the length of the screen, valves co-extensive with said ports to admit pulsations of water to the jig tank, and means to conduct off the particles of different specific gravity after separation on the jig screen.

5. A jig in accordance with claim 4, in which the opposing valves are of the rotatable type and their operating means are co-ordinated and timed to admit simultaneous opposing impulses of water along the opposite sides of the jig tank.

6. A jig comprising a jig tank, a moving endless screen having both flights submerged in the water in the tank, means within the tank for driving and supporting the screen, a water tank adjacent to the jig tank having a port entering the jig tank lengthwise of and between the upper and lower flights of the screen, means to move the screen, valve means to admit impulses of water to the jig tank, and means to conduct off the particles of different specific gravity as separated by the jig.

7. A jigging mechanism according to claim 6, in which a pair of water tanks are provided on opposite sides of the jig, and opposite valves are operated to admit impulses of water from opposite sides of and substantially co-extensive with the screen.

8. In a jigging mechanism in accordance with claim 7, the provision of water tanks on opposite sides of the jig having supply ports elongated in the direction of travel of the screen, rotatable valves for said ports, and co-ordinated and timed driving means to operate said valves to admit simultaneously opposed impulses of water into the jig tank.

9. In a jigging mechanism, a jig tank, a submerged endless screen having its upper and lower flights within the tank and means to move it continuously, mounted in the tank, a water tank alongside the jig tank and having a narrow elongated port for admitting water to the jig tank between upper and lower flights of the screen, said port being in length substantially co-extensive with the effective separating portion of the upper flight of the screen, valve means to admit impulses of water through said port into the jig tank, and discharge means for the graded materials at one end of the screen.

10. In a jigging mechanism, a jig tank, a screen therein, opposing water inlets extending substantially the length of the screen, and co-ordinated valve means to admit simultaneously opposed pulsations of water which are effective for substantially the full length of the screen.

11. A jig comprising a jig tank, a moving endless screen having both flights submerged in the water in said tank, a water tank adjacent to the jig tank having a port entering the jig tank lengthwise of and below the separating portion of the upper flight of the screen, means within the tank, to move and support the screen valve means to deliver impulses of water through said port into the jig tank, and means to conduct off particles of different specific gravity, as separated by the jig.

12. A jig, comprising a jig tank having a screen therein, a source of water supply alongside the jig tank, a plurality of opposed narrow elongated ports for admitting water from said source to said jig tank and substantially co-extensive in length with a side of the jig screen, a plurality of valves substantially co-extensive with said ports and adapted to control the flow of water therethrough, and means to operate said valves in unison to admit water impulses simultaneously through said ports into the jig tank below the level of its screen.

In testimony whereof I affix my signature,

MARTIN J. LIDE.